Jan. 26, 1932. R. H. PLASS 1,842,568
FUR CUTTING MACHINE
Filed March 6, 1931

INVENTOR
Robert H. Plass,
BY
George D. Richards
ATTORNEY

Patented Jan. 26, 1932

1,842,568

UNITED STATES PATENT OFFICE

ROBERT H. PLASS, OF UPPER MONTCLAIR, NEW JERSEY, ASSIGNOR TO THE CHAPAL-DONNER CORPORATION, OF NEWARK, NEW JERSEY, A CORPORATION OF NEW JERSEY

FUR CUTTING MACHINE

Application filed March 6, 1931. Serial No. 520,500.

This invention relates to improvements in fur cutting machines for cutting animal pelts to remove fur from the skins thereof; and this invention has reference, more particularly, to improvements in fur cutting machines of the general type and kind disclosed in my copending application for patent Serial No. 507,144, filed January 7th, 1931.

This invention has for its principal object to provide in combination with means for controlling the movement of a pelt to the cutting knives of means for collecting and carrying away the severed fur in the form of a sheet or bat.

More especially the invention has for an object to provide, adjacent to the cutting point of the cutting mechanism and below the pelt feeding means, an air suction means having in operative relation thereto an endless pervious conveyer belt or apron whereby the fur, as and when severed from the pelt skin, is continuously laid upon said conveyer belt so to be carried away and delivered from the machine in a batting or sheet; means being also provided for removing the conveyed batting or sheet from the conveyer belt or apron.

Other objects of this invention, not at this time more particularly enumerated, will be understood from the following detailed description of the same.

An illustrative embodiment of the present invention is shown in the accompanying drawings, in which:—

Figure 1:
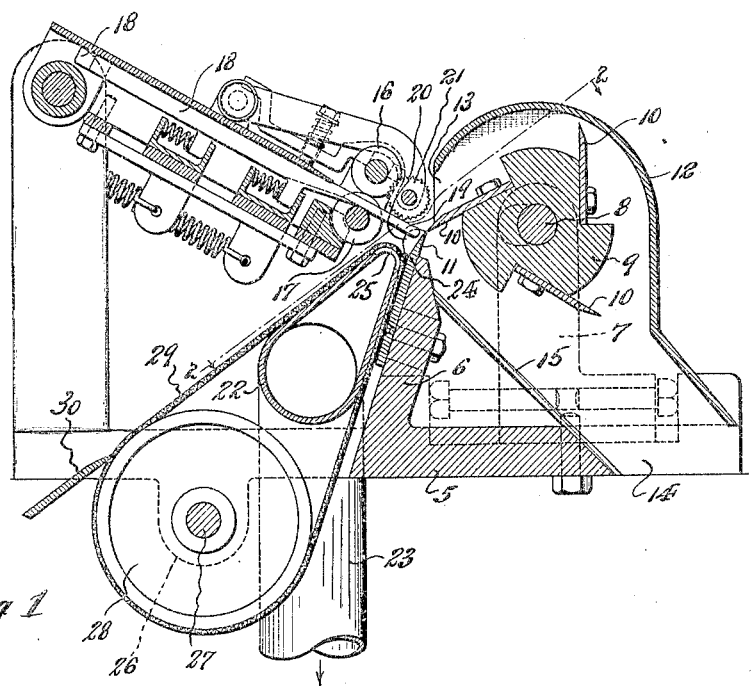
Figure 2:
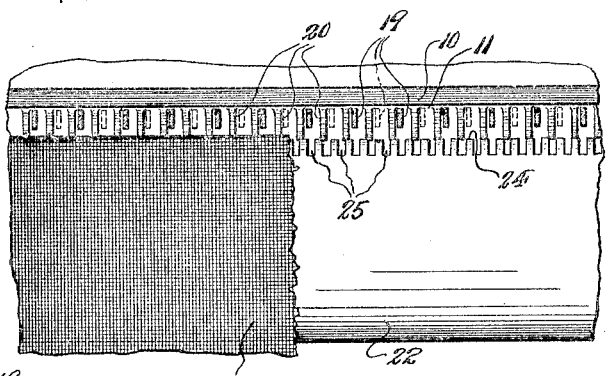
Figure 3:
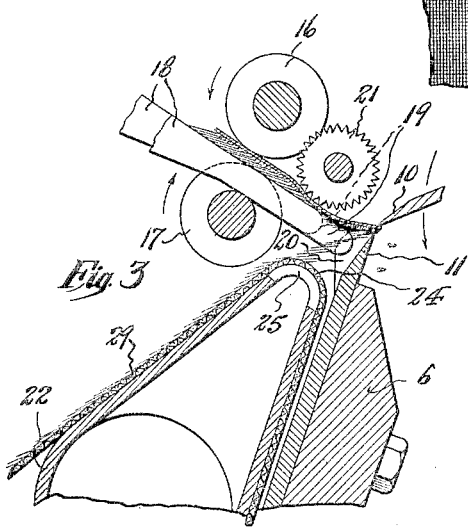

Fig. 1 is a transverse vertical section of a fur cutting machine according to the present invention; Fig. 2 is a fragmentary sectional view, taken on line 2—2 in Fig. 1; and Fig. 3 is an enlarged fragmentary transverse vertical sectional view, illustrating the control and feeding of a pelt to the cutting point of the machine, and the formation and delivery of the severed fur in the desired sheet form or batting.

Similar characters of reference are employed in the above described views, to indicate corresponding parts.

Referring to said drawings, the reference character 5 indicates the bed-plate of the machine, the same having a bed-knife support 6 projecting upwardly therefrom. Mounted on the bed-plate 5, adjacent to its ends and toward the rearward side thereof, are adjustable bearing members 7, to support the main shaft 8, upon which is fixed the cutting cylinder 9 of the machine which carries the revolving cutting knives 10. Said bed-knife support is somewhat rearwardly inclined toward the cutting cylinder, and fixed to said support is a stationary cutting blade or bed knife 11, with the cutting edge of which the edges of said revolving cutting knives cooperate. An enclosing hood 12 is arranged about the cutting cylinder, the same having an opening 13 at its forward side contiguous to the bed knife 11 to admit the pelts fed over the cutting edge of the latter and subject to cutting engagement by the revolving cutting knives 10. At its lower end said hood terminates in a skin chip or sliver discharge passage 14 which overlies a chute plate 15 for discharging the skin chips or slivers.

Various means may be employed for feeding a pelt to the cutting knives of the machine; preferably, however, said feeding means is of the kind shown and described in detail in my aforesaid copending application for Letters Patent Serial No. 507,144, filed January 7, 1931. Such type of feeding means is shown in the accompanying drawings, and, generally, comprises a pair of driven feed rolls 16 and 17 located in front of said bed knife 11, by and between which a pelt is fed toward the latter. Associated with said feed rolls are a series of laterally spaced reciprocable bars 18 having at their inner ends pelt supporting fingers 19 extending between the nip of said feed rolls and said bed knife 11, said bars and their fingers being arranged for alternate longitudinal reciprocation in groups, whereby the advanced fingers afford support for the pelt portions lying between the nip of the feed rolls and the bed knife, while the retracted fingers open clearance spaces for the downward passage of severed fur. The bed knife 11 is preferably provided at its outer face and adjacent to its cutting edge with supporting ribs 20 which interlap and dovetail with the ends of the advanced supporting fingers 19, thus providing a support for the fed pelt right up to the cutting edge of said bed knife. Operative between the feed roll 16 and the cutting edge of the bed knife 11, and disposed above the advanced supporting fingers 19 are driven auxiliary feed rolls 21, which are preferably provided with serrated or toothed peripheries, whereby the same may engage the pelt portions supported by the advanced supporting fingers 19, so as to thrust the same forward to and upon the cutting edge of the bed knife 11.

Suitably supported to extend across the outer face of the bed knife 11, below the cutting edge thereof, and below the supporting fingers 19, is a suction box 22 of suitable cross sectional shape. Connected with one or both ends of said suction box 22 by conduit means 23 is an air suction means or exhaust pump (not shown), whereby air is exhausted from the interior of said suction box. The upper end of said suction box, which is rounded or arched as at 24, and which lies adjacently below the cutting edge of the bed knife 11, is provided with longitudinally spaced apart transverse air intake openings 25, which may, however, be of other shapes as desired. Journaled in suitable bearing members 26 is a suitably driven shaft 27 upon which is fixed, and by which is rotated, a drive roller or pulley 28, the same lying below and forward of the suction box 22. Running over and between said suction-box 22 and drive roller or pulley 28 is an endless flexible conveyer belt or apron 29, which is made of a material pervious to the passage of air therethrough. Said conveyor belt or apron passes over the air intake openings 25 of the suction box, and the suction produced by the latter is effective at the outer side or face of the conveyer belt or apron, at points where the same traverses the intake openings 25 of said suction box. The outer conveying course of said conveyer belt or apron 29 inclines outwardly and downwardly, and adjacent to its lower end is arranged a take-off or doctor plate 30 for removing the discharged sheets or battings of severed fur from the conveyor belt or apron 29.

In the operation of the machine, the pelt, fur side down, is passed into the nip of said feed rolls 16—17, which grip and advance the same toward the bed knife 11, the fur being combed or laid back by the forward movement of the pelt, whereby the bases of the fur filaments are exposed to the cutting action of the revolving knives 10, which, as they pass shearingly along the bedknife 11, operate to shear off a sliver or chip of the pelt skin thereby at the same time severing from the skin sliver or chip the fur filaments close to their roots. The skin sliver or chip will be discharged upon the chute plate 15 to pass away through passage 14 to any suitable waste receiving receptacle. The pelt is supported against sagging away from the bed knife 11, by the reciprocated supporting fingers 19 and supporting ribs 20, in cooperation with which the serrated auxiliary feed rolls 21 assist in feeding the pelt to the cutting point of the machine. The severed fur will be drawn downwardly and away from the cutting point of the machine by the suction effect of air drawn into the suction box 22 through the intake ports 25 thereof. This suction effect is not impeded by the apron or belt 29, since the same is pervious to the ingoing air. It follows, therefore, that as the fur is severed at the cutting point of the machine, it will pass downwardly through the clearance spaces opened by the reciprocated supporting fingers 19, and will be drawn by suction onto the traveling belt or apron 29, so as to lie upon the downwardly descending course of the latter. The severed fur being thus continuously deposited on the belt or apron, will form, upon the descending course thereof, a sheet or batting. As soon as the thus deposited severed fur passes beyond the limits of the intake ports or openings 25 of the suction box, the fur will no longer be adhered to the belt or apron by suction, but merely by contact with the belt or apron surface, and, consequently, the formed sheet or batting of fur may be easily removed in such form from a desired point in the descending course of said belt or apron. To so remove the sheet or batting of fur there is provided a take-off or doctor plate 30, the forward edge of which is opposed to the descending course of the belt or apron 29, so as to pass between the latter and the sheet or batting of fur carried thereon, thus lifting off the latter so that it may slide down the surface of the main body of said take-off or doctor plate, to be thence removed as may be convenient. It is preferable that the take-off or doctor plate 30 may be disposed at a downward and outward inclination relative to the belt or apron 29, whereby the onward movement of the sheet or batting of fur removed from the latter is facilitated.

While I have illustrated in the drawings and above described the specific form of pelt feeding means described in detail in my aforesaid copending application for Letters Patent, and although such form of feeding means may be preferable, nevertheless it will be obvious, that other forms of pelt feeding means may be employed within the scope of this invention as hereinafter claimed, and in so far as the cooperation of the fur sheet or batting forming means therewith is concerned.

I am aware that other changes could be made in the above described mechanisms, as well as in the details of the construction thereof, without departing from the scope of this invention as defined in the appended claims; it is therefore intended that all matter contained in the above description or shown in the accompanying drawings shall be interpreted as illustrative and not in a limiting sense.

I claim:—

1. In a fur cutting machine, a cutting mechanism, means for feeding a pelt to said cutting mechanism, a suction means contiguous to the cutting point of said cutting mechanism, and an air pervious conveyer means movable over said suction means, said conveyer means being adapted to receive the severed fur and by its movement form the latter into a batting or sheet.

2. In a fur cutting machine, a cutting mechanism, means for feeding a pelt to said cutting mechanism, a suction means contiguous to the cutting point of said cutting mechanism, and an air pervious conveyer means movable over said suction means, said conveyer means being adapted to receive the severed fur and by its movement form the latter into a batting or sheet, and means to remove the fur batting or sheet from said conveyer means.

3. In a fur cutting machine, a cutting mechanism, means for feeding a pelt to said cutting mechanism, a suction box having a rounded perforate top disposed contiguous to the cutting point of said cutting mechanism, a driving roller, an endless air pervious conveyer belt running over and between said roller and suction box so as to traverse the rounded perforate top of the latter, said conveyer belt being adapted to receive the severed fur which is initially deposited thereon by the suction effects of said suction box, and said conveyer belt by its movement being adapted to form the fur as thus deposited into a batting or sheet.

4. In a fur cutting machine, a cutting mechanism, means for feeding a pelt to said cutting mechanism, a suction box having a rounded perforate top disposed contiguous to the cutting point of said cutting mechanism, a driving roller, and endless air pervious conveyer belt running over and between said roller and suction box so as to traverse the rounded perforate top of the latter, said conveyer belt being adapted to receive the severed fur which is initially deposited thereon by the suction effects of said suction box, and said conveyer belt by its movement being adapted to form the fur as thus deposited into a batting or sheet, and means to remove the fur batting or sheet from said conveyer means.

5. In a fur cutting machine, a cutting mechanism, feed rolls in front of said cutting mechanism by and between which a pelt is fed toward said cutting mechanism, laterally spaced and longitudinally reciprocable means underlying the pelt in supporting relation thereto and extending beyond the nip of said feed rolls to the cutting mechanism, the spaces between and at the ends of said supporting means when retracted giving clearance for the discharge of severed fur from the cutting mechanism, a suction means below said supporting means and adjacent to the cutting point of said cutting mechanism, and an air pervious conveyer means movable over said suction means, said conveyer means being adapted to receive the severed fur and by its movement form the latter into a batting or sheet.

6. In a fur cutting machine, a cutting mechanism, feed rolls in front of said cutting mechanism by and between which a pelt is fed toward said cutting mechanism, laterally spaced and longitudinally reciprocable means underlying the pelt in supporting relation thereto and extending beyond the nip of said feed rolls to the cutting mechanism, the spaces between and at the ends of said supporting means when retracted giving clearance for the discharge of severed fur from the cutting mechanism, a suction means below said supporting means and adjacent to the cutting point of said cutting mechanism, an air pervious conveyer means movable over said suction means, said conveyer means being adapted to receive the severed fur and by its movement form the latter into a batting or sheet, and means to remove the fur batting or sheet from said conveyer means.

7. In a fur cutting machine, a cutting mechanism, feed rolls in front of said cutting mechanism by and between which a pelt is fed toward said cutting mechanism, laterally spaced and longitudinally reciprocable means underlying the pelt in supporting relation thereto and extending beyond the nip of said feed rolls to the cutting mechanism, the spaces between and at the ends of said supporting means when retracted giving clearance for the discharge of severed fur from the cutting mechanism, a suction box having a rounded perforate top, said perforate top being disposed below said supporting means and adjacent to the cutting point of said cutting mechanism, a driving roller, an endless air pervious conveyer belt running over and between said roller and suction box so as to traverse the rounded perforate top of the latter, said conveyer belt being adapted to receive severed fur which is initially deposited thereon by the suction effects of said suction box, and said conveyer belt by its movement being adapted to form the fur as thus deposited into a batting or sheet.

8. In a fur cutting machine, a cutting mechanism, feed rolls in front of said cutting mechanism by and between which a pelt is fed toward said cutting mechanism, laterally spaced and longitudinally reciprocable means underlying the pelt in supporting relation thereto and extending beyond the nip of said feed rolls to the cutting mechanism, the spaces between and at the ends of said supporting means when retracted giving clearance for the discharge of severed fur from the cutting mechanism, a suction box having a rounded perforate top, said perforate top being disposed below said supporting means and adjacent to the cutting point of said cutting mechanism, a driving roller, an endless air pervious conveyer belt running over and between said roller and suction box so as to traverse the rounded perforate top of the latter, said conveyer belt being adapted to receive severed fur which is initially deposited thereon by the suction effects of said suction box, said conveyer belt by its movement being adapted to form the fur as thus deposited into a batting or sheet, and means to remove the fur batting or sheet from said conveyer means.

In testimony, that I claim the invention set forth above I have hereunto set my hand this 2nd day of March, 1931.

ROBERT H. PLASS.